US011955709B2

(12) United States Patent
Kim et al.

(10) Patent No.: US 11,955,709 B2
(45) Date of Patent: Apr. 9, 2024

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Na Yeon Kim, Seoul (KR); Young Ju Kim, Gyeonggi-do (KR); Yoon Ho Huh, Seoul (KR)

(73) Assignee: DONGWOO FINE-CHEM CO., LTD., Jeollabuk-Do (KR)

(*) Notice: Subject to any disclaimer, the term of this patent is extended or adjusted under 35 U.S.C. 154(b) by 24 days.

(21) Appl. No.: 17/862,919

(22) Filed: Jul. 12, 2022

(65) Prior Publication Data

US 2023/0019158 A1 Jan. 19, 2023

(30) Foreign Application Priority Data

Jul. 13, 2021 (KR) ........................ 10-2021-0091501

(51) Int. Cl.
*H01Q 1/52* (2006.01)
*H01Q 1/22* (2006.01)

(52) U.S. Cl.
CPC ........... *H01Q 1/521* (2013.01); *H01Q 1/2283* (2013.01)

(58) Field of Classification Search
CPC ............................ H01Q 1/521; H01Q 1/2283
See application file for complete search history.

(56) References Cited

U.S. PATENT DOCUMENTS

2018/0205155 A1* 7/2018 Mizunuma ......... H01Q 21/0025

FOREIGN PATENT DOCUMENTS

KR 10-1275159 B1 6/2013
KR 10-2013-0095451 A 8/2013

* cited by examiner

*Primary Examiner* — Graham P Smith
(74) *Attorney, Agent, or Firm* — The PL Law Group, PLLC

(57) ABSTRACT

An antenna package according to an embodiment of the present disclosure includes an antenna device including an antenna unit, a first circuit board including a first core layer having a first surface and a second surface opposite to each other, a signal wiring extending on the first surface of the first core layer to be electrically connected to the antenna unit, and a first via structure penetrating through the first core layer, and a first connector mounted on the second surface of the first core layer, the first connector including a first terminal electrically connected to the antenna unit and the first via structure.

11 Claims, 5 Drawing Sheets

ANTENNA PACKAGE AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2021-0091501 filed on Jul. 13, 2021 in the Korean Intellectual Property Office (KIPO), the entire disclosure of which is incorporated herein by reference for all purposes.

BACKGROUND

1. Field

The present invention relates to an antenna package and an image display device including the same. More particularly, the present invention relates to an antenna package including an antenna device and a circuit board and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to developments of a mobile communication technology, an antenna capable of implementing, e.g., high frequency or ultra-high frequency band communication is needed in the display device.

However, as a driving frequency of the antenna increases, a signal loss may be increased. As a length of a transmission path increases, the signal loss may be further increased.

To connect the antenna to, e.g., a main board of an image display device, a package board including a flexible printed circuit board and a connection intermediate structure such as a connector may be used. In this case, a signal loss may be further increased by the connection intermediate structure.

Further, high-frequency or ultra-high frequency radiation properties may be easily disturbed by an external noise around the connection intermediate structure.

Accordingly, construction of a circuit connection structure for achieving reliability of an electrical connectivity while maintaining or improving radiation properties of the antenna is needed.

SUMMARY

According to an aspect of the present invention, there is provided an antenna package having improved electrical reliability and spatial efficiency.

According to an aspect of the present invention, there is provided an image display device including an antenna package having improved electrical reliability and spatial efficiency.

(1) An antenna package, including: an antenna device including an antenna unit; a first circuit board including: a first core layer having a first surface and a second surface opposite to each other; a signal wiring extending on the first surface of the first core layer to be electrically connected to the antenna unit; and a first via structure penetrating through the first core layer, and a first connector mounted on the second surface of the first core layer, the first connector including a first terminal electrically connected to the antenna unit through the first via structure.

(2) The antenna package of the above (1), wherein one end portion of the signal wiring is bonded to the antenna unit, and the other end portion of the signal wiring is electrically connected to the first terminal of the first connector through the first via structure.

(3) The antenna package of the above (1), wherein the first connector further includes a first barrier structure that is separated from the first terminal and surrounds a periphery of the first connector.

(4) The antenna package of the above (3), wherein the first connector further includes a first insulator disposed within the first barrier structure to fix the first terminal, and a plurality of the first terminals arranged to be spaced apart from each other on the first insulator to form a double-column structure.

(5) The antenna package of the above (4), wherein the first insulator includes a low-k material having a dielectric constant in a range from 2 to 3.5.

(6) The antenna package of the above (1), further including: a second circuit board including a second core layer and a connection wiring; a second connector mounted on one surface of the second core layer to be coupled to the first connector, the second connector including a second terminal electrically connected to the first terminal; and an antenna driving integrated circuit chip mounted on the other surface of the second core layer to be electrically connected to the second connector through the connection wiring.

(7) The antenna package of the above (6), wherein the second circuit board further includes a second via structure penetrating through the second core layer, and the connection wiring extends on the other surface of the second core layer to be electrically connected to the second terminal through the second via structure.

(8) The antenna package of the above (6), wherein the second connector further includes a second barrier structure that is separated from the second terminal and surrounds a periphery of the second connector.

(9) The antenna package of the above (8), wherein the second connector further includes a second insulator disposed within the second barrier structure to fix the second terminal, and a plurality of the second terminals arranged to be spaced apart from each other on the second insulator to form a double-column structure.

(10) The antenna package of the above (9), wherein the second insulator includes a low-k material having a dielectric constant in a range from 2 to 3.5.

(11) An image display device, including: a display panel; and the antenna package of claim 1 disposed on the display panel.

According to embodiments of the present invention, a first circuit board bonded to an antenna device and a second circuit board on which an antenna driving integrated circuit chip is mounted may be electrically connected to each other through a connector structure including a first connector and a second connector. Accordingly, a bonding process or an attaching process for connecting the first and second circuit boards may be omitted, and a stable circuit board connection may be easily implemented.

In exemplary embodiments, a signal wiring extending on a first surface of a first core layer of the first circuit board, and the first connector mounted on a second surface of the first core layer may be electrically connected through a first via structure.

Further, the second connector mounted on one surface of a second core layer of the second circuit board, and a connection wiring extending on the other surface of the second core layer may be electrically connected through a second via structure.

The signal wiring and the first connector, and the connection wiring and the second connector may be disposed on different surfaces. Thus, spatial efficiency of an antenna package may be increased.

Additionally, even though the connector structure is shielded or surrounded by a barrier structure, the connection between the connector structure and the signal wiring and the connection between the connector structure and the connection wiring may be stably implemented. Thus, a signal transmission/reception between the antenna unit and the antenna driving integrated circuit chip may be implemented with high efficiency and high reliability, and enhanced antenna gain properties may be achieved.

DETAILED DESCRIPTION OF THE EMBODIMENTS

According to exemplary embodiments of the present invention, there is provided an antenna package including a combination of a connector and an antenna device that includes an antenna unit. According to exemplary embodiments of the present invention, there is also provided an image display device including the antenna package.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
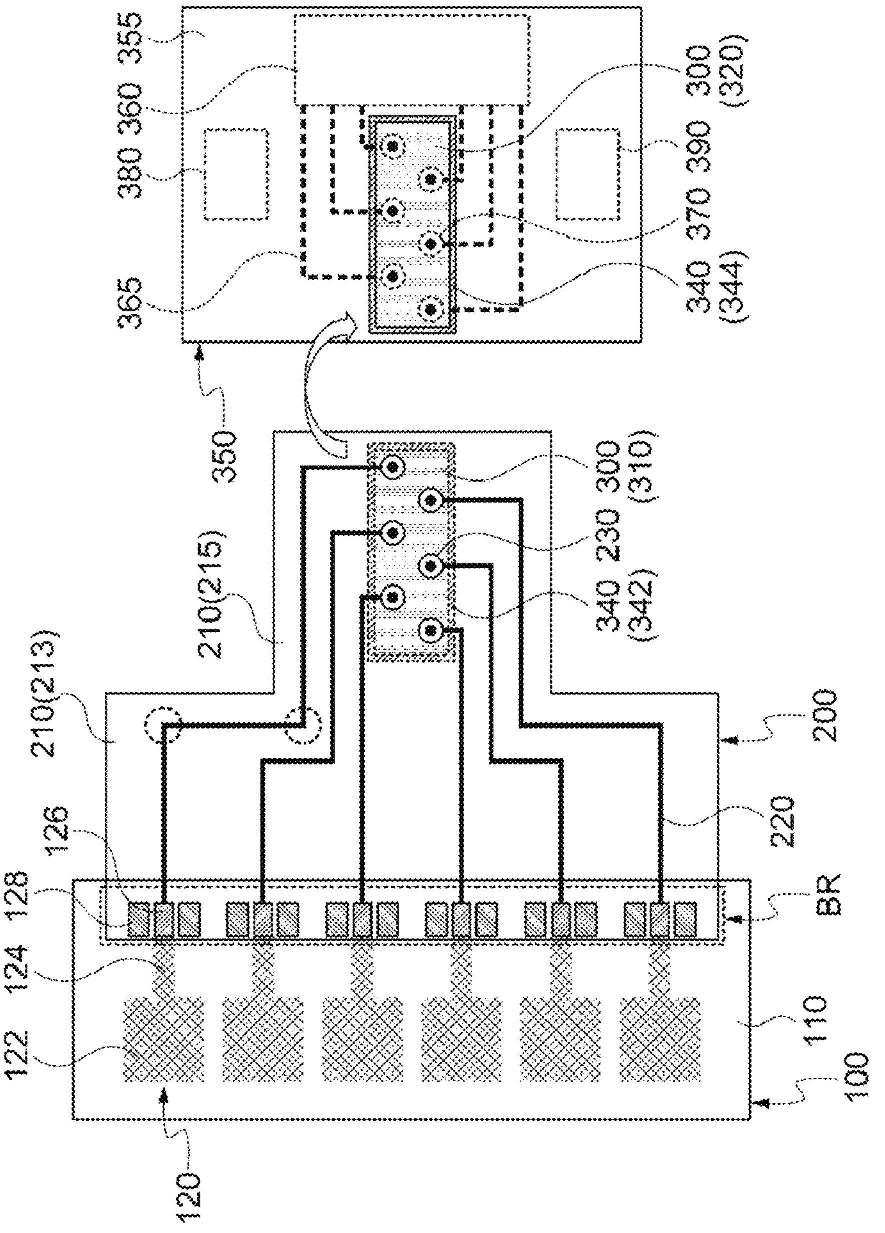
FIGS. 1 and 2 are a schematic top planar view and a schematic cross-sectional view, respectively, illustrating an antenna package in accordance with exemplary embodiments.
Figure 2:
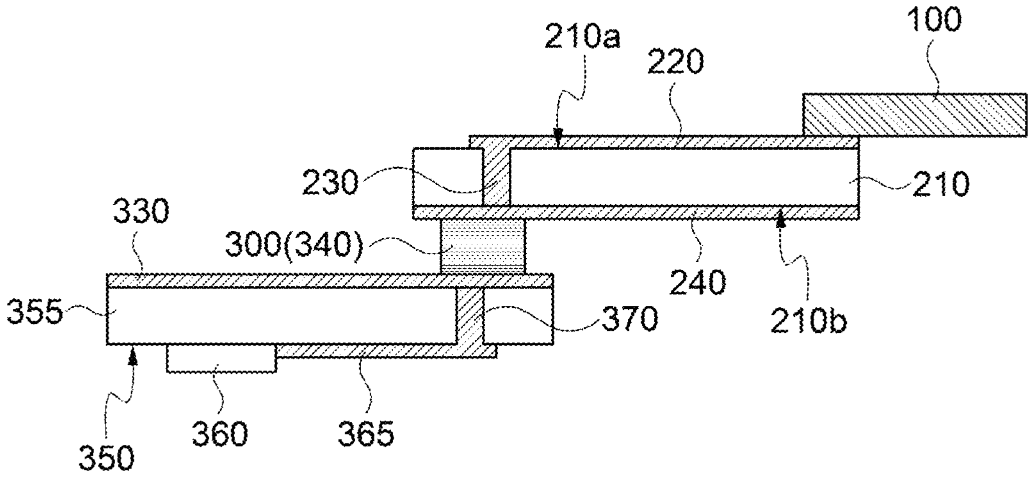

FIGS. 1 and 2 are a schematic top planar view and a schematic cross-sectional view, respectively, illustrating an antenna package in accordance with exemplary embodiments. Specifically, FIG. 1 is a schematic plan view illustrating a state in which a first circuit board 200 and a second circuit board 350 are not coupled through a connector structure 300. FIG. 2 is a schematic cross-sectional view showing the antenna package in which the circuit board 200 and 350 are coupled through the connector structure 300.

Referring to FIGS. 1 and 2, the antenna package may include an antenna device 100, the first circuit board 200 and the connector structure 300. The antenna package may further include the second circuit board 350 connected to the first circuit board 200 through the connector structure 300.

The antenna device 100 may include an antenna dielectric layer 110 and an antenna unit 120 disposed on the antenna dielectric layer 110.

The antenna dielectric layer 110 may include a transparent resin film that may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive material such as an optically clear adhesive (OCA) or an optically clear resin (OCR) may be included in the antenna dielectric layer 110. In some embodiments, the antenna dielectric layer 110 may include an inorganic insulating material such as silicon oxide, silicon nitride, silicon oxynitride, glass, or the like.

In some embodiments, a dielectric constant of the antenna dielectric layer 110 may be adjusted in a range from about 1.5 to about 12. When the dielectric constant exceeds about 12, a driving frequency may be excessively decreased, so that driving in a desired high or ultra-high frequency band may not be implemented.

The antenna unit 120 may be formed on a top surface of the antenna dielectric layer 110. For example, a plurality of the antenna units 120 may be arranged in an array form along a width direction of the antenna dielectric layer 110 or the antenna package to form an antenna unit row.

The antenna unit 120 may include a radiator 122 and a transmission line 124. The radiator 122 may have, e.g., a polygonal plate shape, and the transmission line 124 may extend from a side of the radiator 122. The transmission line 124 may be formed as a single member substantially integral with the radiator 122, and may have a width smaller than that of the radiator 122.

The antenna unit 120 may further include a signal pad 126. The signal pad 126 may be connected to one end portion of the transmission line 124. In an embodiment, the signal pad 126 may be formed as a member substantially integral with the transmission line 124, and a terminal end portion of the transmission line 124 may serve as the signal pad 126.

In some embodiments, a ground pad 128 may be disposed around the signal pad 126. For example, a pair of ground pads 128 may be disposed to face each other with the signal pad 126 interposed therebetween. The ground pad 128 may be electrically and physically separated from the transmission line 124 and the signal pad 126.

The antenna unit 120 or the radiator 122 may be designed to have a resonance frequency corresponding to high frequency or ultra-high frequency band such as 3G, 4G, 5G or higher band. In a non-limiting example, the resonance frequency of the antenna unit may be about 10 GHz or more, or from about 20 GHz to 45 GHz.

In some embodiments, the radiators 122 having different sizes may be arranged on the antenna dielectric layer 110. In this case, the antenna device 100 may be provided as a multi-radiation or multi-band antenna radiating in a plurality of resonance frequency bands.

The antenna unit 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

In an embodiment, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 may include a transparent conductive oxide such as indium tin oxide (ITO), indium zinc oxide (IZO), zinc oxide (ZnOx), indium zinc tin oxide (IZTO), etc.

In some embodiments, the antenna unit 120 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 120 may include a blackened portion, so that a reflectance at a surface of the antenna unit 120 may be decreased to suppress a visual recognition of the antenna unit 120 due to a light reflectance.

In an embodiment, a surface of the metal layer included in the antenna unit 120 may be converted into a metal oxide or a metal sulfide to form a blackened layer. In an embodiment, a blackened layer such as a black material coating layer or a plating layer may be formed on the antenna unit 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, the radiator 122 and the transmission line 124 may include a mesh-pattern structure to improve transmittance. In this case, a dummy mesh pattern (not illustrated) may be formed around the radiator 122 and the transmission line 124.

The signal pad 126 and the ground pad 128 may be a solid pattern formed of the above-described metal or alloy in consideration of a feeding resistance reduction, a noise absorption efficiency, etc.

In an embodiment, the radiator 122 may have the mesh-pattern structure, and at least a portion of the transmission line 124 may include a solid metal pattern.

The radiator 122 may be disposed in a display area of an image display device, and the signal pad 126 and the ground pad 128 may be disposed in a non-display area or a bezel area of the image display device. At least a portion of the transmission line 124 may also be disposed in the non-display area or the bezel area.

The first circuit board 200 may include a first core layer 210 that has a first surface 210*a* and a second surface 210*b* facing each other, and signal wirings 220 extending on the first surface 210*a* of the first core layer 210 to be electrically connected to the antenna unit 120. For example, the first circuit board 200 may be a flexible printed circuit board (FPCB).

The first core layer 210 may include, e.g., a flexible resin such as a polyimide resin, modified polyimide (MPI), an epoxy resin, polyester, a cycloolefin polymer (COP) or a liquid crystal polymer (LCP). The first core layer 210 may include an internal insulating layer included in the first circuit board 200.

The signal wirings 220 may serve as, e.g., feeding lines. The signal wirings 220 may be arranged on the first surface 210*a* (e.g., a surface facing the antenna unit 120) of the first core layer 210.

For example, the first circuit board 200 may further include a coverlay film formed on the first surface 210*a* of the first core layer 210 to cover the signal wirings 220.

In exemplary embodiments, the first circuit board 200 may be electrically connected to the antenna unit 120 on the first surface 210*a* of the first core layer 210.

For example, the signal wirings 220 may be connected to or bonded to the signal pads 126 of the antenna units 120 on the first surface 210*a* of the first core layer 210. For example, a portion of the coverlay film of the first circuit board 200 may be removed to expose one end portions of the signal wirings 220. The exposed one end portions of the signal wirings 220 may be bonded to the signal pads 126.

For example, a conductive bonding structure such as an anisotropic conductive film (ACF) may be attached on the signal pads 126, and then a bonding region BR of the first circuit board 100 in which the one end portions of the signal wirings 220 are located may be disposed on the conductive bonding structure. Thereafter, the bonding region BR of the first circuit board 200 may be attached to the antenna device 100 by a heat treatment/pressurization process, and the signal wiring 220 may be electrically connected to each signal pad 126.

As illustrated in FIG. 1, the signal wirings 220 may be independently connected or bonded to each of the signal pads 126 of the antenna units 120. In this case, feeding and control signaling may be independently performed from the antenna driving integrated circuit (IC) chip 360 to each antenna unit 120.

In some embodiments, the predetermined number of the antenna units 120 may be coupled through the signal wiring 220.

In some embodiments, the first circuit board 200 or the first core layer 210 may include a first portion 213 and a second portion 215 having different widths, and the second portion 215 may have a smaller width than that of the first portion 213.

The first portion 213 may serve as a main substrate portion of the first circuit board 200. One end of the first portion 213 may include the bonding region BR, and the signal wirings 220 may extend from the bonding region BR toward the second portion 215.

The signal wiring 220 may include a bent portion on the first portion 213 as indicated by a dotted circle. Accordingly, the signal wirings 220 may extend on the second portion 215 having a relatively narrow width with a smaller interval or a higher wiring density than that on the first portion 213.

The second portion 215 may serve as a connector coupling portion. For example, the second portion 215 may be bent toward a rear portion of the image display device to be electrically connected to the second circuit board 350. Thus, a circuit connection of the signal wirings 220 may be easily implemented by using the second portion 215 having a reduced width.

Additionally, bonding stability with the antenna device 100 may be improved using the first portion 213 having a relatively large width. When the antenna units 120 of the antenna device 100 are disposed in an array form, a sufficient distribution space of the signal wirings 220 may be provided by the first portion 213.

In exemplary embodiments, the first circuit board 200 and the second circuit board 350 may be electrically connected to each other through the connector structure 300.

In some embodiments, the connector structure 300 may serve as a Board-to-Board (B2B) connector, and may include a first connector 310 mounted on the second surface 210*b* of the first core layer 210 and a second connector 320 mounted on one surface of the second core layer 355 to be coupled to the first connector 310.

For example, the first connector 310 may be mounted using a surface mount technology (SMT) to be connected to the other end portions of the signal wirings 220 through a first via structure 230 on the second portion 215 of the second surface 210*b* of the first core layer 210.

In exemplary embodiments, the first circuit board 200 may include the first via structure that may be formed in the above-described connector coupling portion (e.g., the second portion) and may penetrate through the first core layer 210.

In exemplary embodiments, the signal wiring 220 and the first connector 310 may be electrically connected through the first via structure 230.

For example, the other end portion of the signal wiring 220 extending on the first surface 210*a* of the first core layer 210 may be electrically connected to a first terminal 314 of the first connector 310 mounted on the second surface 210*b* of the first core layer 210 through the first via structure 230.

In this case, the antenna unit 120 and the first connector 310 formed on different surfaces of the first circuit board 200 may be electrically connected to each other by the first via structure 230. Accordingly, spatial efficiency and applicability of the antenna package may be improved. Further, the antenna unit 120 and the first connector 310 may be electrically connected while preventing a signal interference and shielding a noise by a barrier structure 340 as will be described later.

For example, the first via structure 230 may be formed from substantially the same member as that of the signal wiring 220. For example, a via hole may be formed in the second portion 215 of the first core layer 210, and the signal wiring 220 and the first via structure 230 may be formed of substantially the same material.

In some embodiments, a first ground layer 240 may be further formed on the second surface 210*b* of the first core layer 210. Accordingly, noises around an intermediate structure including the signal wiring 220, the first via structure 230 and the first connector 310 may be shielded, and a signal loss may be reduced.

The second circuit board 350 may be, e.g., a main board of an image display device, or a rigid printed circuit board. For example, the second circuit board 350 may include a resin (e.g., epoxy resin) layer impregnated with an inorganic material (e.g., a prepreg) such as glass fiber as a base insulating layer or the second core layer 355, and may include circuit wirings distributed on a surface and at an inside of the base insulating layer.

An antenna driving IC chip 360 may be mounted on the other surface of the second core layer 355. The second connector 320 may be mounted on one surface of the second core layer 355 by, e.g., a surface mount technology (SMT). For example, the second connector 320 may be electrically connected to the antenna driving IC chip 360 through a connection wiring 365 formed on the other surface of the second core layer 355.

In exemplary embodiments, the second circuit board 350 may include a second via structure 370 electrically connecting the second connector 320 and the connection wiring 365 and penetrating through the second core layer 355.

For example, one end portion of the connection wiring 365 extending on the other surface of the second core layer 355 may be electrically connected to the antenna driving IC chip 360.

For example, the other end portion of the connection wiring 365 may be electrically connected to a second terminal 324 of the second connector 320 mounted on the one surface of the second core layer 355 through the second via structure 370.

In this case, the antenna driving IC chip 360 and the second connector 320 formed on different surfaces of the second core layer 355 may be electrically connected to each other through the second via structure 370. Accordingly, spatial efficiency of the antenna package may be improved, and the signal interference may be prevented by the barrier structure 340, while facilitating the electrical connection between the antenna driving IC chip 360 and the second connector 320.

For example, the second via structure 370 may be formed of substantially the same member as that of the connection wiring 365. For example, a via hole may be formed in a region in which the second connector 320 of the second circuit board 350 is mounted, and the connection wiring 365 and the second via structure 370 may be formed of substantially the same material.

In some embodiments, a second ground layer 330 may be further formed on the one surface of the second core layer 355. Accordingly, noises around an intermediate structure including the connection wiring 365, the second via structure 370 and the second connector 320 may be shielded and the signal loss may be reduced.

As indicated by an arrow in FIG. 1, the first connector 310 mounted on the second surface 210*b* of the first core layer 210 and the second connector 320 mounted on the one surface of the second core layer 355 may be coupled to each other. For example, the first connector 310 may serve as a plug connector or a male connector, and the second connector 320 may serve as a receptacle connector or a female connector.

Accordingly, the connection of the first circuit board 200 and the second circuit board 350 may be implemented by the connector structure 300, and the electrical connection of the antenna driving IC chip 360 and the antenna units 120 may be implemented. Thus, feeding/control signal (e.g., a phase signal, a beam tilting signal, etc.) may be applied from the antenna driving IC chip 360 to the antenna unit 120. Further, an intermediate structure of the first circuit board 200-the connector structure 300-the second circuit board 350 may be formed.

As described above, the first and second circuit boards 200 and 350 may be electrically coupled to each other using the connector structure 300. Accordingly, the first circuit board 200 and the second circuit board 350 may be easily coupled to each other by using the connector structure 300 without an additional heating or pressing process such as an attachment process or a bonding process.

Therefore, a dielectric loss due to thermal damages to the board and an increase of resistance due to wiring damages which may be caused by the heating and pressing process may be avoided, and to the signal loss in the antenna unit 120 may be prevented.

A circuit device 380 and a control device 390 may be mounted on the other surface of the second core layer 355 in addition to the antenna driving IC chip 360. The circuit device 380 may include, e.g., a capacitor such as a multi-layered ceramic capacitor (MLCC), an inductor, a resistor, or the like. The control device 390 may include, e.g., a touch sensor driving IC chip, an application processor (AP) chip, or the like.

For example, as illustrated in FIG. 1, a length of the connector structure 300 in the length direction may be greater than a length of the connector structure 300 in a width direction.

However, the shape of the connector structure 300 is not limited as illustrated in FIG. 1. For example, as for the shape of the connector structure 300, the length in the width direction of the connector structure 300 may be greater than the length in the length direction.

Figure 3:
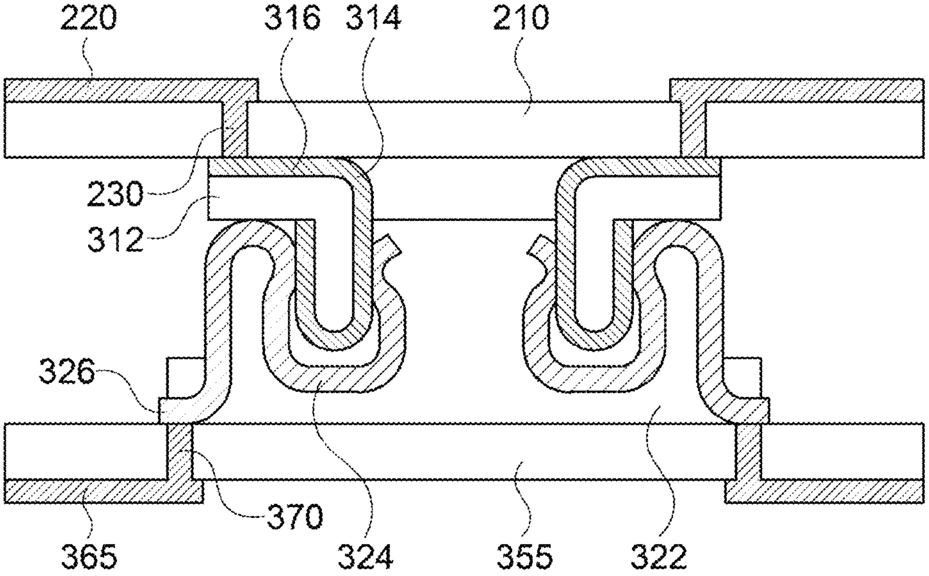
FIG. 3 is a schematic top plan view illustrating a connector in accordance with exemplary embodiments.

FIG. 3 is a schematic top plan view illustrating a connector in accordance with exemplary embodiments. For convenience of descriptions, an illustration of the barrier structure 340 is omitted in FIG. 3.

Referring to FIG. 3, each of the first connector 310 and the second connector 320 may include a terminal.

The first connector 310 may include a first insulator 312 and first terminals 314. The first insulator 312 may be disposed within a first barrier structure 342, and may serve as a base material for fixing the first terminals 314. The first insulator 312 may include an insulating protrusion.

In some embodiments, the first terminals 314 may be arranged to be spaced apart from each other on the first insulator 312 to form a double-column structure. In this case, coupling force and stability of the connector structure 300 may be improved. Accordingly, reliability and impact resistance of the antenna package may be improved.

The first connector 310 may include first connection leads 316 connected to the first terminals to be in contact with the first via structure 230.

For example, first connection leads 316 may extend from each of the first terminals 314, and each of the first connection leads 316 may contact each of the first via structures 230. Accordingly, each of the first connection leads 316 may correspond to each of the signal pads 126 included in the antenna device 100.

In some embodiments, the first ground layer 240 may be disposed between the first terminals 314. In this case, a structure of "the first terminal 314-the first ground 240" may be repeated. Accordingly, an additional signal interference prevention and noise shielding between individual connection pads or terminals may be implemented.

The second connector 320 may include a second insulator 322 and second terminals 324. The second insulator 322 may be disposed within a second barrier structure 344, and may serve as a base for fixing the second terminals 324. The second insulator 322 may include a recess.

The second connector 320 may include second connection leads 326 connected to the second terminals 324 to be in contact with the second via structure 370. The second connection leads 326 may correspond to each of the connection wirings 365 formed on the other surface of the second core layer 355.

In some embodiments, the second terminals 324 may be arranged to be spaced apart from each other on the second insulator 322 to form a double-column structure. In this case, the first connector 310 and the second connector 320 may be coupled in a double-column shape, so that the coupling force and stability of the connector structure 300 may be improved. Accordingly, reliability and impact resistance of the antenna package may be improved.

In some embodiments, a second ground layer 330 may be disposed between the second terminals 324. In this case, a structure of "the second terminal 324-the second ground 330" may be repeated. Accordingly, an additional signal interference prevention and noise shielding between individual connection pads or terminals may be implemented.

In some embodiments, the insulators 312 and 322 may include a low-k material or an insulation material having a permittivity (Dk, or dielectric constant) in a range from 2 to 3.5, and a loss tangent (Df, or dielectric loss) in a range from 0.0015 to 0.007.

Within the above range, in, e.g., a communication band of a high-frequency or ultra-high frequency range of 20 GHz or more, signal loss and gain reduction in the connector structure 300 may be prevented, and sufficient radiation properties may be achieved from the antenna units 120.

In some embodiments, the first insulator 312 and the second insulator 322 may include a liquid crystal polymer (LCP) structure, a polyphenylene sulfide (PPS) structure, and/or a modified polyimide (MPI) structure.

In exemplary embodiments, the connector structure 300 may include the barrier structure 340 that may be disposed around the terminals 314 and 324 to be spaced apart therefrom and may include a conductive material.

For example, the barrier structure 340 may include the first barrier structure 342 included in the first connector 310 and the second barrier structure 344 included in the second connector 320.

In some embodiments, the first connector 310 may further include the first barrier structure 342 separated from the first terminals 314 to surround a periphery of the first connector 310. For example, the first barrier structure 342 may be disposed to surround four peripheries of the first terminals 314 arranged in the two-column structure.

In some embodiments, the second connector 320 may further include the second barrier structure 344 separated from the second terminals 324 to surround a periphery of the second connector 320. For example, the second barrier structure 344 may be disposed to surround four peripheries of the second terminals 324 arranged in the double-column structure.

In this case, signal loss that may occur at an end portion of the connector structure 300 may be prevented, and an external noise shielding may be implemented. Accordingly, signal efficiency may be increased to improve the antenna gain.

For example, the first connector 310 and the second connector 320 may be coupled such that the first barrier structure 342 and the second barrier structure 344 may be engaged to shield the four peripheries around the terminals 314 and 324. Thus, signal loss caused by a signal interruption from both sides or end portions of the connector structure 300 may be entirely prevented to provide an enhanced external noise shielding.

For example, the four peripheries of the connector structure 300 may be shielded by the barrier structure 340. In this case, the connection between the signal wiring 220 and the first connector 310 and the connection between the connection wiring 365 and the second connector 320 may be physically blocked. Accordingly, signaling between the antenna unit 120 and the antenna driving IC chip 360 may be interfered.

However, according to exemplary embodiments of the present invention, the signal wiring 220 extending on the first surface 210*a* of the first core layer 210 may be connected to the first terminal 314 (or the first connection lead 316) of the first connector 310 through the first via structure

230. Further, the connection wiring 365 extending on the other surface of the second core layer 355 may be connected to the second terminal 324 (or the second connection lead 326) of the second connector 320 through the second via structure 370.

Accordingly, the connection between the signal wirings 220 and the first connector 310 and between the connection wiring 365 and the second connector 320 may be implemented while implementing the signal loss prevention and noise shielding from the barrier structure 340. Thus, signal transmission/reception between the antenna unit 120 and the antenna driving IC chip 360 may be sufficiently performed while providing improved antenna gain.

Figure 4:
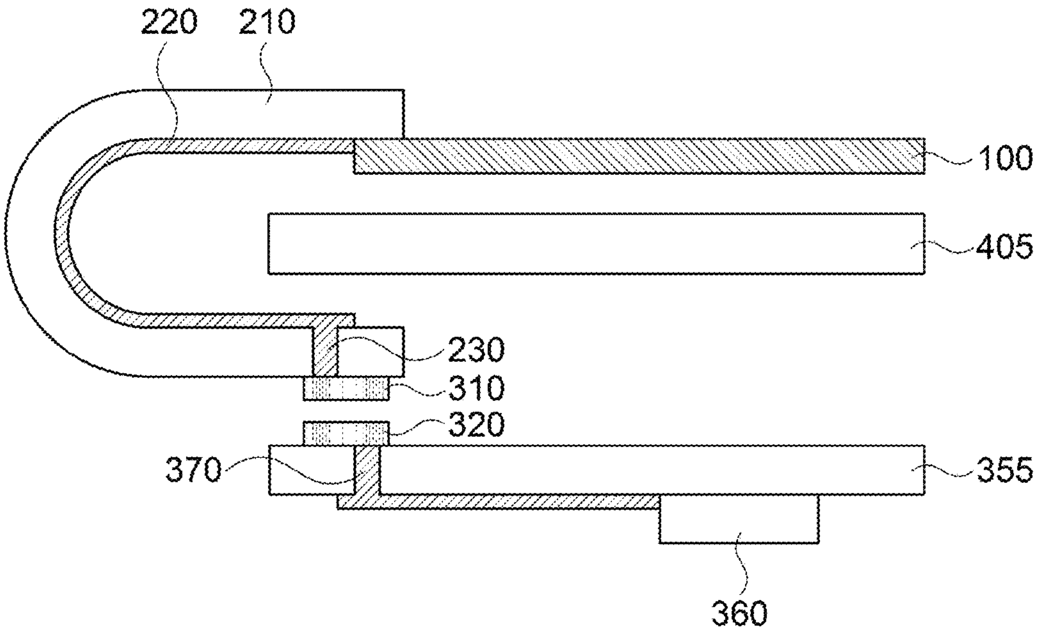
FIGS. 4 and 5 are a schematic cross-sectional view and a schematic top plan view, respectively, illustrating an image display device in accordance with exemplary embodiments.
Figure 5:
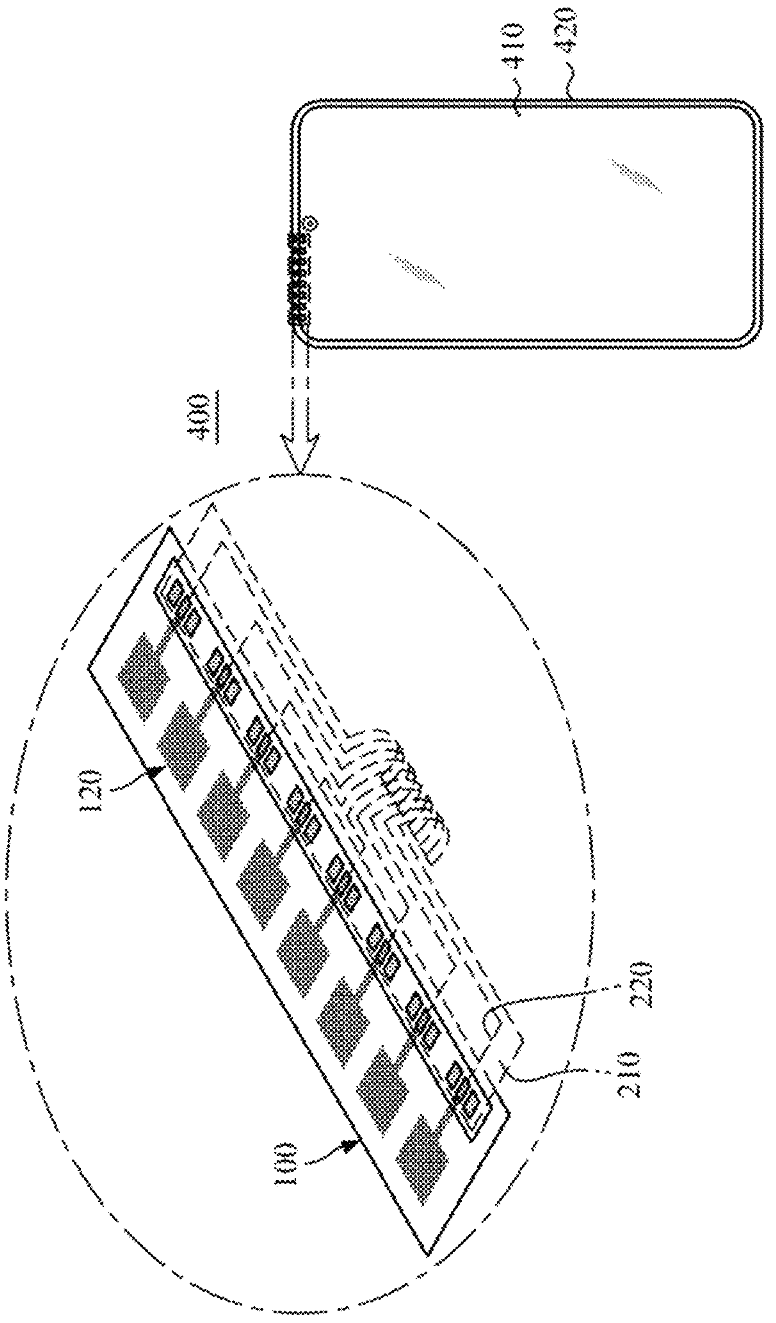

FIGS. 4 and 5 are a schematic cross-sectional view and a schematic top plan view, respectively, illustrating an image display device in accordance with exemplary embodiments.

Referring to FIGS. 4 and 5, an image display device 400 may be fabricated in the form of, e.g., a smartphone, and FIG. 5 illustrates a front portion or a window surface of the image display device 400. The front portion of the image display device 400 may include a display area 410 and a peripheral area 420. The peripheral area 520 may correspond to, e.g., a light-shielding portion or a bezel portion of the image display device.

For example, the antenna device 100 included in the above-described antenna package may be disposed toward the front portion of the image display device 400, and may be disposed on the display panel 405. In an embodiment, the radiators 122 may be at least partially disposed on the display area 410.

In this case, the radiator 122 may include a mesh-pattern structure, and a decrease of transmittance due to the radiator 122 may be prevented. The pads 126 and 128 included in the antenna unit 120 may be formed in a solid metal pattern, and may be disposed in the peripheral area 420 to prevent degradation of an image quality.

In some embodiments, the first circuit board 200 may be bent and disposed at a rear portion of the image display device 400, and may extend toward the second circuit board 350 (e.g., the main board) on which the antenna driving IC chip 360 is mounted.

As illustrated in FIG. 4, the signal wiring 220 may be bent along a curved profile of the first circuit board 200 on the first surface 210*a* of the first core layer 210 to extend to the first via structure 230.

The first circuit board 200 and the second circuit board 350 may be interconnected through the connector structure 300 so that feeding and driving control of the antenna device 100 from the antenna driving IC chip 360 may be implemented.

As described above, signal transmission/reception between the antenna unit 120 and the antenna driving IC chip 360 may be implemented through the via structures 230 and 370 and the connector structure 300. Additionally, the barrier structure 340 may be disposed around the terminals 314 and 324 of the above-described connector structure 300, so that a high-reliable antenna package may be provided.

What is claimed is:

1. An antenna package, comprising:

an antenna device comprising an antenna dielectric layer and an antenna unit disposed on the antenna dielectric layer;

a first circuit board comprising:

a first core layer having a first surface and a second surface opposite to each other, the first core layer being different from the antenna dielectric layer;

a signal wiring extending on the first surface of the first core layer to be electrically connected to the antenna unit; and a first via structure penetrating through the first core layer; and a first connector mounted on the second surface of the first core layer, the first connector comprising a first terminal electrically connected to the antenna unit through the first via structure.

2. The antenna package of claim 1, wherein one end portion of the signal wiring is bonded to the antenna unit, and the other end portion of the signal wiring is electrically connected to the first terminal of the first connector through the first via structure.

3. The antenna package of claim 1, wherein the first connector further comprises a first barrier structure that is separated from the first terminal and surrounds a periphery of the first connector.

4. The antenna package of claim 3, wherein the first connector further comprises a first insulator disposed within the first barrier structure to fix the first terminal, and a plurality of the first terminals arranged to be spaced apart from each other on the first insulator to form a double-column structure.

5. The antenna package of claim 4, wherein the first insulator includes a low-k material having a dielectric constant in a range from 2 to 3.5.

6. The antenna package of claim 1, further comprising:

a second circuit board comprising a second core layer and a connection wiring;

a second connector mounted on one surface of the second core layer to be coupled to the first connector, the second connector comprising a second terminal electrically connected to the first terminal; and an antenna driving integrated circuit chip mounted on the other surface of the second core layer to be electrically connected to the second connector through the connection wiring.

7. The antenna package of claim 6, wherein the second circuit board further comprises a second via structure penetrating through the second core layer; and the connection wiring extends on the other surface of the second core layer to be electrically connected to the second terminal through the second via structure.

8. The antenna package of claim 6, wherein the second connector further comprises a second barrier structure that is separated from the second terminal and surrounds a periphery of the second connector.

9. The antenna package of claim 8, wherein the second connector further comprises a second insulator disposed within the second barrier structure to fix the second terminal; and a plurality of the second terminals arranged to be spaced apart from each other on the second insulator to form a double-column structure.

10. The antenna package of claim 9, wherein the second insulator includes a low-k material having a dielectric constant in a range from 2 to 3.5.

11. An image display device, comprising:

a display panel; and the antenna package of claim 1 disposed on the display panel.

* * * * *